US011920748B2

(12) United States Patent
Baird

(10) Patent No.: US 11,920,748 B2
(45) Date of Patent: Mar. 5, 2024

(54) FLAME EFFECT DEVICE

(71) Applicant: Paul Christopher Baird, Tanworth-in-Arden (GB)

(72) Inventor: Paul Christopher Baird, Tanworth-in-Arden (GB)

( * ) Notice: Subject to any disclaimer, the term of this patent is extended or adjusted under 35 U.S.C. 154(b) by 0 days.

(21) Appl. No.: 18/207,251

(22) Filed: Jun. 8, 2023

(65) Prior Publication Data

US 2023/0400164 A1 Dec. 14, 2023

(30) Foreign Application Priority Data

Jun. 8, 2022 (GB) ..................................... 2208377

(51) Int. Cl.

| | |
|---|---|
| ***F21S 10/04*** | (2006.01) |
| ***F21V 14/04*** | (2006.01) |
| ***F21V 17/10*** | (2006.01) |
| ***F24C 7/00*** | (2006.01) |

(52) U.S. Cl.

CPC ............ *F21S 10/046* (2013.01); *F21V 14/04* (2013.01); *F21V 17/10* (2013.01); *F24C 7/004* (2013.01)

(58) Field of Classification Search

CPC .......... F21S 10/046; F24C 7/004; F21V 14/04

See application file for complete search history.

(56) References Cited

U.S. PATENT DOCUMENTS

| | | | | |
|---|---|---|---|---|
| 3,699,697 A * | 10/1972 | Painton | F24C 7/004 | 40/428 |
| 6,944,982 B2 * | 9/2005 | Schroeter | F24C 7/004 | 472/65 |
| 2010/0188859 A1 | 7/2010 | Zhao | | |

(Continued)

FOREIGN PATENT DOCUMENTS

| | | |
|---|---|---|
| CN | 102434844 A | 5/2012 |
| CN | 112923320 A * | 6/2021 |
| GB | 1200724 A | 7/1970 |

OTHER PUBLICATIONS

Search Report in GB Application No. 2208377.8; dated Nov. 8, 2022.

(Continued)

*Primary Examiner* — Alexander K Garlen

(74) *Attorney, Agent, or Firm* — WIGGIN AND DANA LLP

(57) ABSTRACT

A flame effect device (18) for a flame simulator apparatus of an electric fire (10) is provided. The flame effect device (18) comprises a spindle (20) having a longitudinal axis which is in-use rotatable in a flame simulator apparatus; and a plurality of reflector supports (22*a*,22*b*,22*c*,22*d*,22*e*), each reflector support (22*a*,22*b*,22*c*,22*d*,22*e*) comprising: a reflector support body (32) having at least one reflector mounting portion (28) thereon and a mounting aperture (34) to engage the reflector support (22*a*,22*b*,22*c*,22*d*,22*e*) with the spindle (20); and at least one reflector (26) to reflect light from an associated light source (24), wherein the at least one reflector (26) is mounted to the at least one reflector mounting portion (28), the plurality of reflector supports (22*a*,22*b*, 22*c*,22*d*,22*e*) being engageable with the spindle (20), each (Continued)

reflector support (22*a*,22*b*,22*c*,22*d*,22*e*) of the plurality of reflector supports (22*a*,22*b*,22*c*,22*d*,22*e*) being selectably positionable along the longitudinal axis of the spindle (20).

18 Claims, 8 Drawing Sheets

(56) References Cited

U.S. PATENT DOCUMENTS

| | | | | |
|---|---|---|---|---|
| 2011/0299283 | A1* | 12/2011 | Gallo | F21S 10/04 362/282 |
| 2012/0155075 | A1* | 6/2012 | Asofsky | F24C 7/004 362/231 |
| 2016/0258585 | A1* | 9/2016 | Gallo | F21S 10/046 |
| 2016/0281943 | A1 | 9/2016 | Chen | |
| 2017/0167678 | A1* | 6/2017 | Gallo | F21S 10/046 |
| 2018/0299086 | A1* | 10/2018 | Gallo | F21S 10/046 |

OTHER PUBLICATIONS

European Search Report in EP Application No. 23 17 8248; dated Sep. 13, 2023.

* cited by examiner

FLAME EFFECT DEVICE

CROSS-REFERENCE TO RELATED APPLICATION

This United States non-provisional patent application claims priority to GB 2208377.8, filed Jun. 8, 2022, which is hereby incorporated by reference in its entirety herein.

TECHNICAL FIELD

The present invention relates to a flame effect device particularly, but not necessarily exclusively for use with a flame simulator apparatus of an electric fire. The invention further relates to a method of assembling a flame effect device, a reflector support for use with said flame effect device and a flame simulator apparatus using said flame effect device.

BACKGROUND

Electric fires are well known appliances that have been widely used for years to generate flame effects that simulate the burning of a real fire. Electric fires have many advantages over real fires. Firstly, safety is increased due to the absence of a naked flame. Electric fires are often also more energy efficient, easier to control, cleaner, more reliable, and typically involve less maintenance. These benefits make electric fires a good choice for people that want the effect of a fire, without the risk and hassle of a real fuel fire.

The flame effect of an electric fire is commonly produced by the emission of light from within an artificial fuel such as imitation logs or coals to give the impression of a real fire. Alternatively, the flame effect may be produced by reflecting the light from a light source onto a screen located behind an artificial fuel.

Current electric fires do not produce very realistic flame effects. The flame effects are achieved through the use of a rotating spindle that has reflective elements arranged along it. The spindle is positioned above a light source, such that as the spindle rotates, the reflective elements reflect the light of the light source and produce an imitation flame onto an associated screen. Often, the spindles and reflective elements are integrally formed, and the reflective elements are of the same shape and dimension. The use of these spindles creates a repetitive flame flicker, which is organised and visually unlike the randomised flickering of a real fire. Additionally, when standard spindles are used in electric fires with more than one light sources, as the reflective elements are the same shape and dimension, the flame effect produced is the same for each light source, resulting in an unrealistic flame effect. This is particularly undesirable when multiple light sources of varying colours are used, as the user is unable to control the shape, intensity or duration of the imitation flame produced by the reflection elements of the spindle.

The present invention seeks to provide a more realistic flame effect that also allows the user to customise the flame effect according to their needs and wants.

SUMMARY

According to a first aspect of the invention, there is provided a flame effect device for a flame simulator apparatus of an electric fire, the flame effect device comprising: a spindle having a longitudinal axis which in-use rotates in a flame simulator apparatus; and a plurality of reflector supports each reflector support comprising: a reflector support body having at least one reflector mounting portion thereon and a mounting aperture to engage the reflector support with the spindle; and at least one reflector to reflect light from an associated light source, wherein the at least one reflector is mounted to the at least one reflector mounting portion, the plurality of reflector supports adapted to engage with the spindle, each reflector support of the plurality of reflector supports adapted to be selectably positioned along the longitudinal axis of the spindle In an embodiment, the present invention provides a flame effect device for creating a more realistic flame effect, and increases the ease with which bespoke flame effects can be created. As the reflectors are individually mounted to reflector supports and then engaged with the spindle, it allows the position of the reflectors to be selected by the user, so the flame effect can be changed on demand, and with ease by the user.

In an embodiment, preferably, each reflector support body may be at least in part rigid or resilient. Optionally, each reflector support of the plurality of reflector supports may be adapted to slidably move along the longitudinal axis of the spindle.

In an embodiment, having a part rigid or resilient body allows the reflector supports to retain their structural integrity and rotate with the spindle. This is superior to flexible reflectors mounted directly to the spindle, known in the art. Additionally, being only partially rigid may allow the reflector supports to slide along the longitudinal axis of the spindle whilst under pressure or force from a user. The plurality of reflector supports being slidably moveable allows for each respective reflector support to be slid along the spindle to a desired location. Therefore, the reflector supports may be aligned to sit above a respective light source of an associated electric fire when the flame effect device is in use. It allows the user to have full control over the position of each reflector supports, and thus the generated flame effect.

In an embodiment, preferably, the spindle may have a uniform thickness along the longitudinal axis.

In an embodiment, it may be advantageous for the spindle to be of uniform thickness, as it allows the reflector supports to slide along the longitudinal axis of the spindle with ease. It may also allow for the movement of reflector supports without needing to dismantle the spindle, or remove additional stopper or spacer elements.

In an embodiment, preferably, the reflector support body may directly contact the spindle around an entire perimeter of the mounting aperture.

In an embodiment, direct contact of the reflector support body with the spindle ensures the reflector supports rotate with the spindle and reduces the risk of unwanted movement of the reflector supports, either rotationally, or in the longitudinal direction. Having less contact with the spindle may result in the spindle rotating within the mounting aperture, rather than the reflector support rotating with the spindle.

In an embodiment, the at least one reflector mounting portion is in a pre-determined position on the outer surface of each reflector support.

In an embodiment, advantageously, having at least one reflector mounting portion in a pre-determined position, allows the user to ensure that the reflector mounting portion is in a suitable position for reflecting the light from an associated light source when a reflector is mounted to it, increasing the ease of use. Consistent flame effects are also produced by identical reflectors placed on identical reflector supports, so the user knows what to expect when deciding which reflectors and reflector supports to use to achieve their desired flame effect. Furthermore, having at least one reflector mounting portion is in a pre-determined position increases the ease of manufacture.

In an embodiment, the at least one reflector mounting portion may have a major axis parallel or substantially parallel to the longitudinal axis of the spindle.

In an embodiment, having a major axis parallel or substantially parallel to the longitudinal axis of the spindle is beneficial as it ensures that when a reflector is mounted to the reflector mounting portion, the reflector will reflect light from an associated light source in the desired manner. The orientation of the reflector is important for creating a realistic flame effect. The major faces of the reflector elements need to be aligned with the light beams of the associated light sources to ensure the desired shape and intensity of the imitation flame is achieved. If the reflectors are not suitably aligned, the imitation flame will not directly reflect the intended imitation flame of the reflector's dimension and shape.

In an embodiment, preferably, a plurality of said reflector mounting portions may be provided, with each reflector mounting portion having the same dimensions as each other.

In an embodiment, to create realistic fire effects, different arrangements of reflectors will be desired. The provision of a plurality of reflector mounting portions allows for multiple reflectors to be mounted to one reflector support. A plurality of reflector mounting portions may therefore allow for a wide variety of reflector supports to be built. The reflector mounting portions being of same dimensions as each other allows for the reflector supports to be universal and interchangeable. Overall, the provision of a plurality of reflector mounting portions increase user control and selectability.

In an embodiment, the at least one reflector mounting portion may be formed as a recess on the outer surface of each reflector support of the plurality of reflector supports.

In an embodiment, a recess, or similar notch, is a simple way of providing a reflector mounting portion. A recess allows the rest of the outer surface to be smooth to minimise light interference.

In an embodiment, preferably, at least one of said plurality of reflector supports has a plurality of reflectors, and the plurality of reflectors of the at least one said plurality of reflector supports is different in number to the at least one reflector of at least one other said plurality of reflector supports.

In an embodiment, the provision of at least one of the reflector supports having a different number of reflectors to another reflector support allows for a variety of reflector supports to be provided as part of the flame effect device. Having a variety of reflector supports can help to improve the realism of the flame effect, as different light sources will be reflected at different speeds, and at different intensities. A reflector support having two reflectors will result in a slower flicker speed than a reflector support with four reflectors for example. Therefore, by incorporating reflector supports with different numbers of reflectors, the speed of the flickering of the fire for different light sources will be more varied and randomised, and thus more akin to a real fuel fire. This may help improve the user experience.

In an embodiment, preferably, the at least one reflector may have an engagement portion which receivably engages with the at least one reflector mounting portion. Optionally, the engagement portion of each reflector of the plurality of reflectors are identical.

In an embodiment, each reflector having an engagement portion increases the ease of engagement with the reflector mounting portion of the reflector support. To allow a user to avoid a consistent, predictable and unrealistic flicker and create a bespoke and/or realistic flame effect, multiple reflectors may be needed. The reflectors may be of different sizes and dimensions. Having identical engagement portions allows for the reflectors to be universal and selectably engageable with the reflector mounting portions of the reflector supports. Therefore, the user can tailor the flame effect device to their needs.

In an embodiment, each reflector of the plurality of reflectors may have at least one reflection portion to reflect light from an associated light source.

In an embodiment, each reflector having a reflector portion allows for light to be reflected off the reflectors onto an associated projection screen to produce a desired flame effect.

In an embodiment, at least one reflector of the plurality of reflectors may have a reflection portion of a different shape to a reflection portion of at least one other reflector of the plurality of reflectors.

In an embodiment, having different shaped reflection portions on different reflectors increases the variety of flame flickers and imitation flames produced by the flame effect device. This also allows for reflectors of different dimensions and shapes to be purposely selected and arranged above lights of varying colours, such that some light colours appear more dominant in the flame effect, whilst other light colours are less dominant. This may result in a more seemingly randomised and thus realistic flame effect.

In an alternative embodiment, at least one reflector of the plurality of reflectors has a reflection portion that may be a different shape to at least one other reflection portion of said at least one reflector of the plurality of reflectors.

In an embodiment, providing different shaped reflection portions on the same reflector increases the variety of flame flicker and imitation flame effect that arises from using said reflector, at a given longitudinal position of the spindle. This may result in a more disorganised and realistic flame effect.

In a further alternative embodiment, at least one reflector of the plurality of reflectors has a reflection portion that may be a same shape as at least one other reflection portion of said at least one reflector of the plurality of reflectors.

In an embodiment, reflectors having the same reflection portions provide a more consistent flame effect. This may also increase the ease of manufacture. For example, the reflectors may be stamped out of a reflective material with increased ease. This is particularly beneficial if the shapes of the reflectors tesselate with one another, as then less material is wasted.

In an embodiment, optionally, each reflector support may have a plurality of reflector mounting portions having the same dimensions as one another.

In an embodiment, the reflector mounting portions being of the same dimensions as each other increases the universal nature of the mounting portions. It allows the reflector mounting portions to be reused and interchanged by the user with ease.

In an embodiment, preferably, the reflector support body may have a friction coefficient substantial enough to hold on to the spindle without a fixing element.

In an embodiment, friction coefficient low enough to allow the reflector supports to be slidably moved along the spindle whilst under force, but a friction coefficient large enough to provide enough friction so that the reflector supports remain in place when not under force is beneficial, as the reflector supports can be mounted to the spindle with ease.

In an embodiment, each reflector support may further comprise a fastening element to engage with the spindle.

In an embodiment, the provision of a fastening element is a simple and practical way of providing additional securing forces to the reflector support to ensure it does not move from the spindle in an undesired manner.

In an embodiment, the fastening element may comprise a washer and/or an O-ring and/or glue and/or a screw.

In an embodiment, washers, O-rings and screws are all relatively simple means of securing a reflector support to the spindle as they are all relatively simple, reversible and easy to use.

Additionally, washers, O-rings and screws are highly suited for temporary installation, and thus the reflector supports can be reused with ease. The use of glue is also a simple and easy to use securing means. Glue is more suited towards permanent installation, therefore if the user only wanted to create one desired flame effect this may be beneficial. However reusable glues, such as water-soluble adhesives may be utilised to allow the reflector supports to be repositioned and reused if needed.

In an embodiment, preferably, the diameter, or equivalent dimension for non-circular cross-sections, of the mounting aperture may be of a similar or substantially similar dimension to the diameter, or equivalent dimension, of the spindle.

In an embodiment, beneficially, the mounting aperture of each reflector supports having a diameter, or equivalent dimension for non-circular cross-sections, similar or substantially similar dimension to the diameter, or equivalent dimension, of the spindle allows for the spindle to pass through the mounting aperture with ease, whilst retaining an interference fit engagement. Therefore, movement of the reflector supports is easily achieved. The diameter or equivalent dimension for non-circular cross-sections, being greater than the diameter, or equivalent dimension of the spindle may increase the likelihood of the reflector supports moving along the spindle independently. As such, the reflector supports may become misaligned with their respective light sources and produce an unwanted flame effect.

According to a second aspect of the invention, there is provided a method of assembling a flame effect device the method comprising the steps of: a] providing a spindle suitable to be used in an electric fire; b] providing a plurality of reflector supports to engage with said spindle; c] selectably engaging each reflector support of the plurality of the reflector supports with a longitudinal axis of the spindle in a specific configuration to get a desired flame effect; and d] placing the spindle within the electric fire.

In an embodiment, the present invention is particular suited towards constructing customised and reusable flame effect devices suitable for producing a desired flame effect. The user assembling the flame effect device has complete control over the reflector supports used. The user can not only choose the desired reflector support having the desired reflectors, and reflector mounting portions, they can also choose how many reflector supports are placed on the spindle.

The user can also decide on the desired positions of said reflector supports relative to associated light sources.

In an embodiment, optionally, prior to step [a] there may be the additional step of: selectably engaging at least one reflector with each of reflector support of the plurality of reflector supports to create a desired flame effect.

In an embodiment, providing a plurality of both reflector supports and reflectors allows the user to create the desired flame effect with ease. The flame effect is achieved through building customised reflector supports with a combination of reflectors positioned along the reflector supports that create the desired flame effect.

According to a third aspect of the invention, there is provided a reflector support for use with a flame effect device, the reflector support comprising: an at least in part rigid or resilient body having at least one reflector mounting portion thereon and a mounting aperture to engage the reflector support with an associated spindle of a flame effect device; and at least one reflector to reflect light from an associated light source, wherein the at least one reflector is mounted to the at least one reflector mounting portion.

In an embodiment, the reflector support can be utilised with multiple spindles. The mounting aperture being shape-matingly engageable with an associated spindle allows for existing spindles to be retrofitted with reflector supports to create a bespoke flame effect.

According to a fourth aspect of the invention, there is provided a flame simulator apparatus comprising: a flame simulator housing; a flame effect device which is positioned in the flame simulator housing; and a light source positioned in the flame simulator housing and which is arranged to direct light towards the flame effect device to create a flame effect displayed from the flame simulator apparatus In the state of the art, flame effect devices provide consistent, predictable and uncustomisable flame effects. Advantageously, the present invention provides a flame effect device that can be customised and tailored to the needs and wants of a user. The user has control over the flame effect provided by each individual light source within the electric fire. Reliable and tailored flame effects are provided by the reflector supports and reflectors. Additionally, the reflector supports are easy to personalise and create.

BRIEF DESCRIPTION OF THE DRAWINGS

The invention will now be more particularly described, by way of example only, with reference to the accompanying drawings, in which.

DETAILED DESCRIPTION

The present invention provides a more realistic flame effect that also allows the user to customise the flame effect according to their needs and wants. In various embodiments, provided for are flame effect devices for a flame simulator apparatus of an electric fire. In further embodiments, provided for are methods for assembling flame effect devices. In yet further embodiments, provided for are reflector supports for use with flame effect devices. In yet further embodiments, provided for are flame simulator apparatuses.

Figure 1:
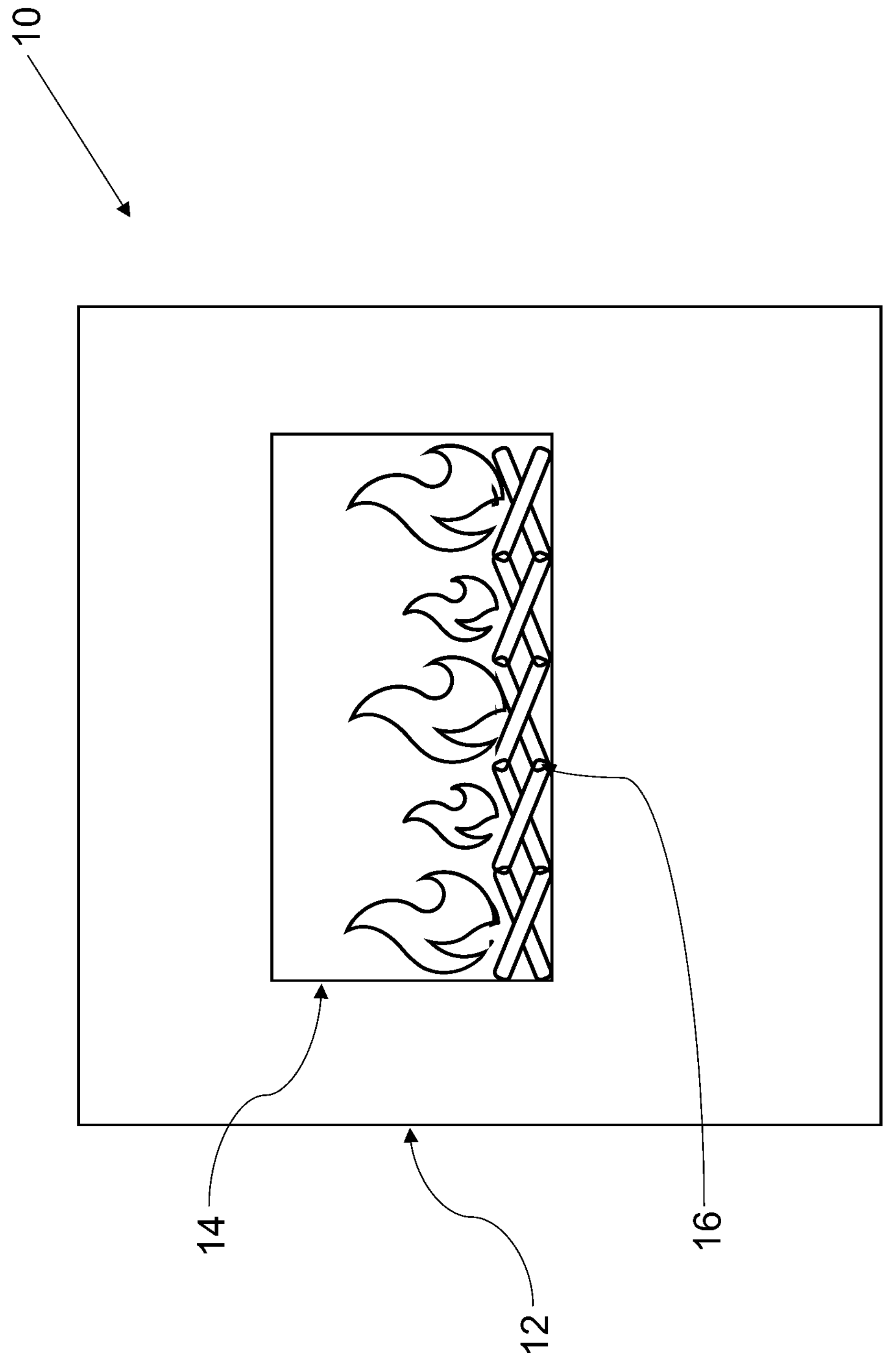
FIG. 1 shows a front representation of a first embodiment of a flame simulator apparatus in accordance with the fourth aspect of the invention.

Referring to FIG. 1 there is provided an electric fire, indicated globally at 10. The electric fire 10 has a rigid outer casing 12. The electric fire 10 has a projection screen 14 located within the rigid outer casing 12. The projection screen 14 is configured to project a simulated fire effect thereon. The projection screen 14 may be static to allow for a flame effect to be projected onto the screen to be viewed by the user. Alternatively, the projection screen 14 may be a moveable mesh to increase the three-dimensionality of the flame effect. This may achieve a holographic or pseudo-holographic effect. It is also envisaged that a combination of different projection screen 14 types may be used to achieve the desired flame effect.

The rigid outer casing 12 has a transparent, preferably glass or quartz window on a front face of the rigid outer casing 12. The window allows a user to view the projection screen 14 upon which the simulated fire effect is created by a fire simulator apparatus. The electric fire 10 is shown in an on condition in which the flame effect can be seen by a user.

The electric fire 10 may be provided with an artificial fuel bed 16, to add to the realism of the flame effect. In the depicted embodiment, the artificial fuel bed 16 provided is formed of imitation or real logs. However, the artificial fuel bed 16 may include imitation or real coal, pebbles, and the like. The imitation fuel may be selected depending on the overall desired flame effect, and user feel of the fire. The elements of the artificial fuel bed 16 may be formed separately from one another, or they may be integrally formed with one another.

Figure 2:
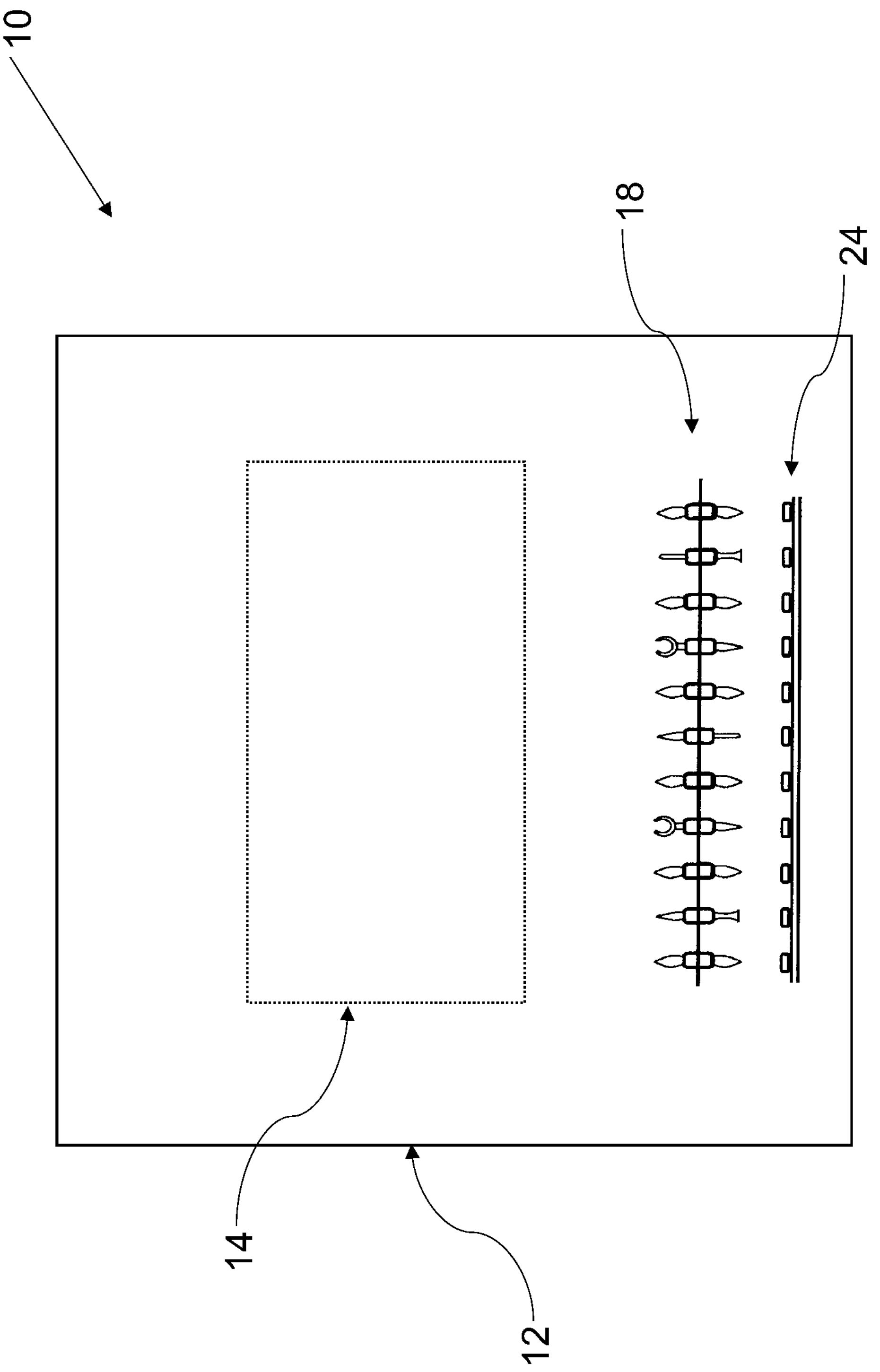
FIG. 2 shows a front representation of the flame simulator apparatus of FIG. 1, with a front panel removed to show a first embodiment of a flame effect device in accordance with the first aspect of the invention.

FIG. 2 shows the electric fire 10 with the rigid outer casing 12 removed. The electric fire 10 is shown in an off condition in which the flame effect is not being produced and therefore cannot be seen by a user. A flame effect device 18 is provided within the lower half of the electric fire 10. A light source 24, which may be provided in the form of a strip with one or more LED spotlights, is positioned below the flame effect device 18. The light source 24 is not limited to LED spotlights, it is envisaged other non-LED light sources such as incandescent, halogen or fluorescent bulbs may be utilised. The light sources 24 may be provided with lens to focus the light of the light source 24. A variety of commercially available lens may be utilised depending on the desired outcome.

The flame effect device 18 is preferably positioned below the projection screen 14, to give the impression of flames coming up through the artificial fuel bed 16. The flame effect device 18 has a spindle 20, and a plurality of reflector supports 22. Each reflector support 22*a*, 22*b*, 22*c*, 22*d*, 22*e* of the plurality of reflector supports 22 is arranged to be positionally aligned with a respective light source 24. The flame effect device 18 will be discussed in more detail in relation to FIG. 3.

The positioning of the flame effect device 18 relative to the light source 24 and flame effect device 18 may be altered both vertically and horizontally depending on the desired flame effect. Arranging the flame effect device 18 closer to the light source 24 will result in more of the light from the light source 24 being scattered to produce the imitation flame effect, correspondingly, the further the flame effect device 18 is positioned from the light source 24, the less light will be scattered to produce the imitation flame effect. Changing the horizontal positioning of the flame effect device 18 may result in only partial reflection of the light from the light source 24.

Figure 3:
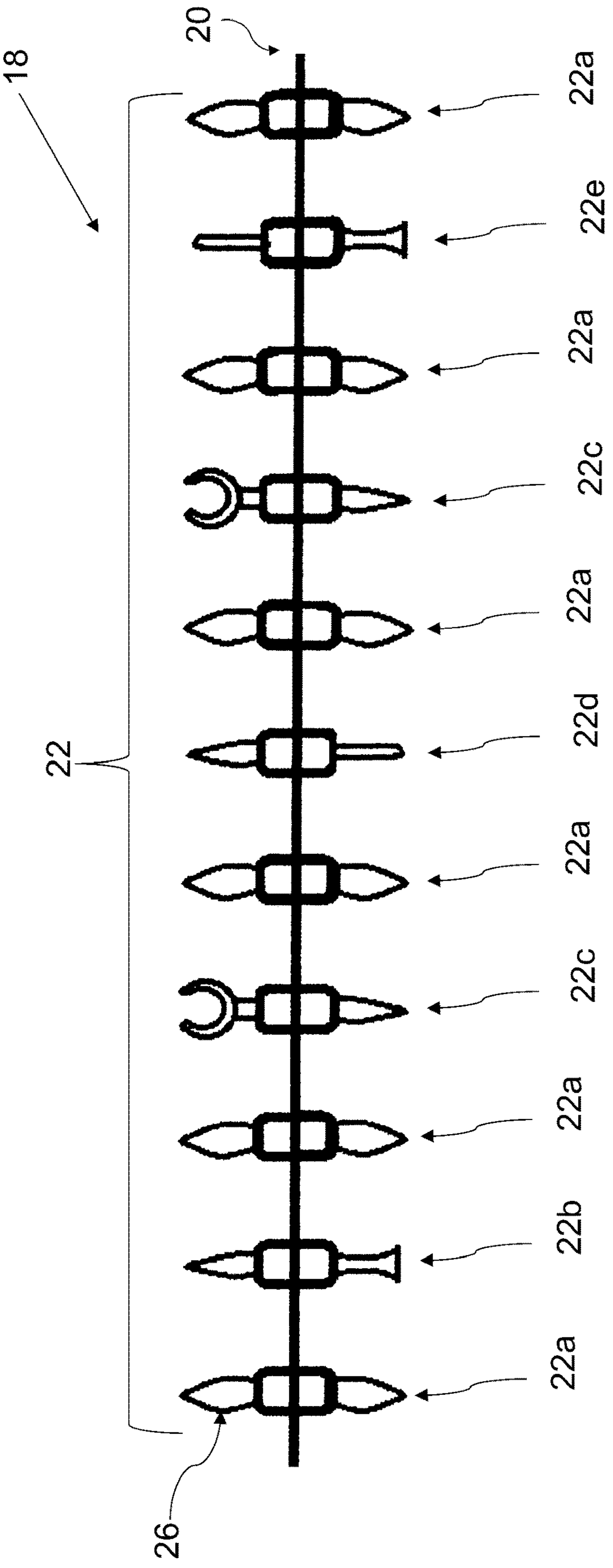
FIG. 3 shows a front representation of the flame effect device of FIG. 2.

An exemplary embodiment of the flame effect device 18 is illustrated in FIG. 3. The reflector supports 22*a*, 22*b*, 22*c*, 22*d*, 22*e* are shown engaged with the spindle 20. As depicted, each reflector support 22*a*, 22*b*, 22*c*, 22*d*, 22*e* has at least one reflector 26 mounted thereon via a reflector mounting portion 28; an indicative example of a reflector support 22*a* is shown in more detail in FIG. 4. Although two reflectors 26 are visible mounted upon each reflector support 22*a*, 22*b*, 22*c*, 22*d*, 22*e*, it is appreciated that any number of reflectors 26, up to the number of reflector mounting portions 28, may be mounted upon each reflector support 22*a*, 22*b*, 22*c*, 22*d*, 22*e*. The number of reflectors 26 being determined by the user's desired flame effect. Additionally, reflector supports 22 with differing numbers of mounting portions 28 and/or reflectors 26 may be provided.

The spindle 20 of the flame effect device 18 is rotatable. The spindle 20 is preferably of a uniform thickness along the longitudinal extent. This allows for the reflector supports 22*a*, 22*b*, 22*c*, 22*d*, 22*e* to be engaged with the longitudinal extent of the spindle 20 with ease. Additionally, the spindle 20 having a uniform extent allows the reflector supports 22*a*, 22*b*, 22*c*, 22*d*, 22*e* to be slid with ease along the spindle 20 to a desired position. It may be possible to mount spacers to the spindle 20 to space the reflector supports 22 in a specific pattern.

Preferably, the longitudinal extent of the spindle 20 may be determined by the longitudinal extent of an associated fuel bed 16. The larger the longitudinal extent of an associated fuel bed 16, the larger the longitudinal extent of the spindle 20. This would ensure the desired flame effect is produced along the majority of the fuel bed 16, to create a realistic fire experience for the user.

The reflector supports 22*a*, 22*b*, 22*c*, 22*d*, 22*e* are arranged along the spindle 20 so that as the spindle 20 rotates, the reflectors reflect the beam of light from a light source 24 up onto the projection screen 14.

Figure 4:
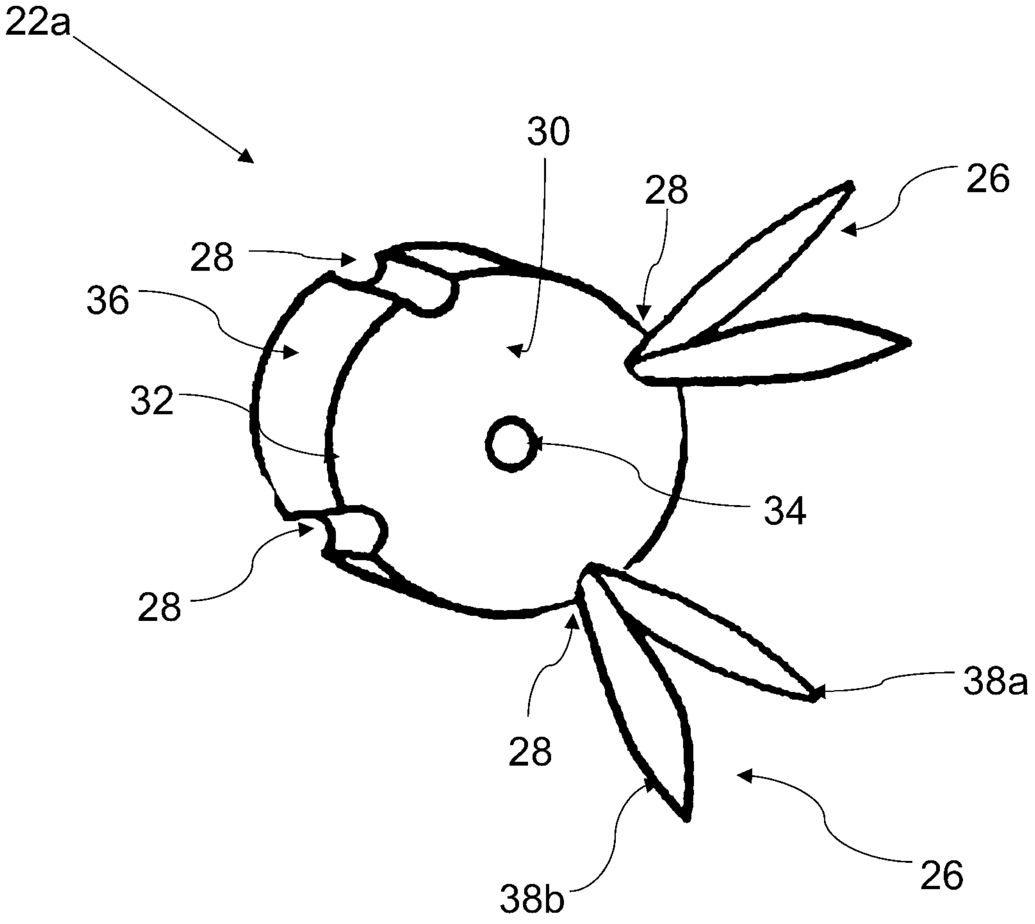
FIG. 4 shows a front perspective view of a first embodiment of a reflector support to engage with a spindle of the flame effect device of FIG. 2.

The flame effect device 18 has a plurality of reflector supports 22. The reflector supports 22 may have the same or a different number of mounting portions 28 and/or reflectors 26. FIG. 4 illustrates a reflector support 22*a* in more detail. The reflector supports 22*a* each have a reflector support body 32 with first and second major opposed surfaces 30. The first and second major opposed surfaces 30 effectively form the front and rear sides of the reflector support 22*a*. The first and second major opposed sides 30 are flat or substantially flat, so as to reduce interference with light from the light source 24.

The reflector support 22*a* is preferably formed from a partially rigid or resilient material. For example, a rubber, plastic, silicon, nitrile, neoprene or a composite material could be used, but any appropriately rigid and resilient material is envisaged as being utilised. The reflector support body 32 is preferably made from a material with a friction coefficient low enough to allow the reflector supports 22*a* to be slidably engaged with the spindle 20 when under force, but a friction coefficient large enough to provide enough friction between the reflector support body 32 and spindle 20 such that the reflector supports 22*a* remain in place when not under force.

Each reflector support body 32 in the illustrated embodiment has a circular cross-section. However, a substantially circular, hexagonal, substantially hexagonal, oval, or substantially oval cross-section can be envisaged. Cross-sectional shapes having fewer angles may be provided to reduce interference with light from the light source 24.

In the depicted embodiment, the reflector support body 32 has a mounting aperture 34 which allows the spindle 20 to pass through the reflector support body 32. The mounting aperture 34 is located at a central position on the first and second major opposed surfaces 30, and extends from the first major opposed surface to the second major opposed surface. The perimeter of the mounting aperture 34 is preferably bound by the first and second major opposed surfaces 30.

The mounting aperture 34 preferably has a minimum diameter which is preferably greater than or equal to the diameter of the spindle 20. Even more preferably, the minimum diameter is not much greater than the diameter of the spindle 20, to allows for a close fit. For instance, this clearance may be not greater than 1 mm. It is foreseeable that the minimum diameter of the mounting aperture 34 could be much larger than the diameter of the spindle 20, however this would be disadvantageous as when the spindle 20 is rotating, the reflector support 22*a* may not rotate consistently with the spindle 20, it may instead rotate in an undesired manner. This could result in unwanted flame effects. To overcome the potential lateral movement, stoppers or spacers could be provided that are placed on the longitudinal axis of the spindle 20 to sandwich the reflector supports 22*a* in position.

The outer perimeter 36 of the reflector support body 32 preferably has a smooth curved surface. The curved surface extends between the first and second major opposed surfaces 30 to define the outer surface 36.

In the depicted embodiment, the reflector support 22*a* has four reflector mounting portions 28 on the outer surface 36. Each reflector mounting portion 28 has a major axis parallel or substantially parallel to the longitudinal axis of the spindle 20. Preferably, the reflector mounting portion 28 is formed as a recessed slot or notch. The slot preferably does not substantially extend towards the mounting aperture 34, so the structural integrity of the reflector support is maintained. The reflector supports 22 may be provided with one or more mounting portions 28 and/or reflectors 26.

The reflector mounting portions 28 in the depicted embodiment are provided in predetermined positions along the outer surface. The predetermined positions are equally spaced. Four reflector mounting portions 28 are provided in FIG. 4, with two reflector mounting portions 28 unoccupied, and two reflector mounting portions 28 occupied by reflectors 26. As there are four reflector mounting portions 28, the reflector mounting portions 28 are positioned at nominal north, east, south and west positions. Accordingly, as the number of reflector mounting portions 28 provided increases, the spacing between the reflector mounting portions 28 decreases. Alternatively, it is foreseen that although the positions of the reflector mounting portions 28 may be predetermined, they may not be of equal spacing, as this could have improved benefits for randomness of the flickering of the flame effect.

The recessed slot forming the reflector mounting portion 28 has a longitudinal axis parallel to the longitudinal axis of the mounting aperture 34 through which the spindle 20 passes. The recessed slot preferably extends from the first major opposed surface to the second major opposed surface along the lateral extent of the outer surface 36. It is envisaged however that the slot may only partially extend across the lateral extent of the outer surface 36.

The dimensions and shapes of the depicted recessed slots forming the reflector mounting portions 28 are depicted as identical. This is beneficial as it increases the versatility and universal nature of the reflector support 22*a*. This may not be strictly necessary, and indeed, may be desirable to have recessed slots of different dimensions, for instance, if different types of reflector 26 necessitate this.

As shown in FIG. 4, reflectors 26 can be mounted to the reflector mounting portions 28. Reflectors 26 may be mounted to all of the available reflector mounting portions 28. Alternatively, the user may choose to have reflectors 26 mounted to only a selection of the available reflector mounting portions 28, as in the illustrated embodiment. This allows for the user to have control over where and the number of the reflectors 26 being positioned on the reflector supports 22*a* so as to achieve the desired flame effect. Each reflector support 22*a* can thus be easily adapted to a user's preference.

The reflectors 26 shown are folded into the reflector mounting portions 28, so that each reflector mounting portion 28 has two reflection portions extending therefrom.

FIGS. 5(A), 5(B), 5(C), 5(D) and 5(E) shows five embodiments of reflectors 26*a*, 26*b*, 26*c*, 26*d*, 26*e*. The reflectors 26*a*, 26*b*, 26*c*, 26*d*, 26*e* are preferably made from foil, although any suitably reflective and preferably flexible and/or resilient, material such as mirrors or polished aluminium may be utilised. Foil is preferable, as the reflectors 26*a*, 26*b*, 26*c*, 26*d*, 26*e* are preferably deformable. The foil may be of one uniform colour, alternatively the foil may be multicoloured to affect the colour of the imitation flame.

Preferably, each reflector 26*a*, 26*b*, 26*c*, 26*d*, 26*e* has at least one engagement portion 40*a*, 40*b*. The engagement portions 40*a*, 40*b* are preferably complementarily shaped to the reflector mounting portions 28 of the reflector supports 22*a*, 22*b*, 22*c*, 22*d*, 22*e* to allow for ease of engagement. The engagement portions 40*a*, 40*b* of all the reflectors 26*a*, 26*b*, 26*c*, 26*d*, 26*e* embodiments are preferably similar or substantially similar for ease of use, manufacture and selectability.

Each reflector 26*a*, 26*b*, 26*c*, 26*d*, 26*e* also has at least one reflection portion 38*a*, 38*b*. The reflection portion 38*a*, 38*b* has two major faces. The major faces are preferably flat and smooth to encourage reflection and minimise surface interference with the reflected light. The reflection portion 38*a*, 38*b* extends axially away from the engagement portion 40*a*, 40*b*. The five embodiments illustrated in FIGS. 5(A), 5(B), 5(C), 5(D) and 5(E), each have two reflection portions 38*a*, 38*b* and two engagement portions 40*a*, 40*b*, though the two engagement portions 40*a*, 40*b* are continuously formed, and are merely separated by a point of flexion or bending where the reflector 26*a*, 26*b*, 26*c*, 26*d*, 26*e* can be bent in two.

The engagement portion 40*a*, 40*b* and reflection portions 38*a*, 38*b* of the reflector 26*a*, 26*b*, 26*c*, 26*d*, 26*e* may be integrally formed. The engagement portion 40*a*, 40*b* may be defined by perforations upon the reflector 26*a*, 26*b*, 26*c*, 26*d*, 26*e*. The reflection portions 38*a*, 38*b* are preferably between 1 to 5 cm in length. The engagement portions 40*a*, 40*b* are preferably 0.1 to 1 cm in length. However, the size of the engagement portions 40*a*, 40*b* is preferably dictated by the size of the reflector mounting portions 28 of the reflector support 22*a*.

Figure 5E:
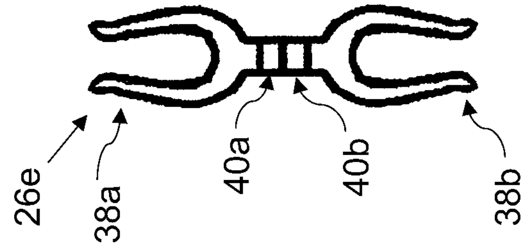
FIGS. 5(A)-5(E) show front representations of a first, in FIG. 5(A), second, in FIG. 5(B), third, in FIG. 5(C), fourth, in FIG. 5(D), and fifth, in FIG. 5(E), embodiments of a reflector for reflecting light, mountable with reflector support of FIG. 4.
Figure 5D:
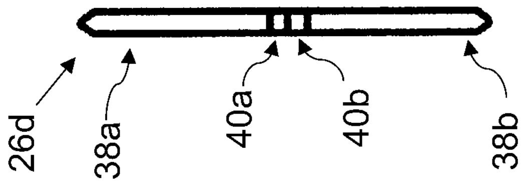
Figure 5C:
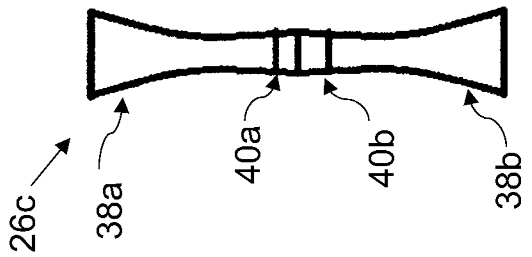
Figure 5B:
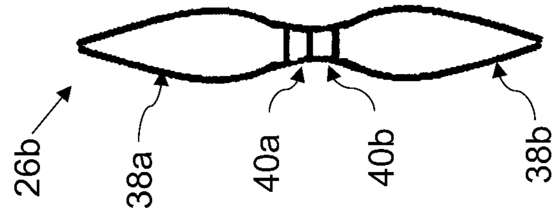
Figure 5A:
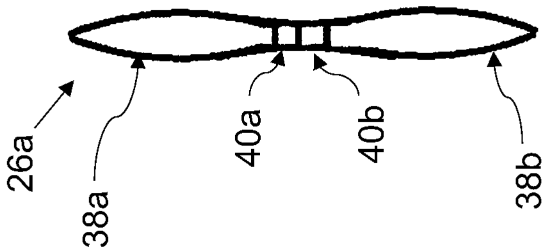

In a first embodiment illustrated in FIG. 5(A), the reflection portion 38*a*, 38*b* of the reflector 26*a* may be marquise in shape, alternatively, the reflection portion 38*a*, 38*b* may be oval or substantially oval. In second embodiment illustrated in FIG. 5(B), the reflection portion 38*a*, 38*b* of the reflector 26*b* may be teardrop in shape, or may similar have a pointed tip. In third embodiment illustrated in FIG. 5(C), the reflection portion 38*a*, 38*b* of the reflector 26*c* may have a truncated triangular shape. In the fourth embodiment illustrated in FIG. 5(D), the reflection portion may have a thin elongate shape, alternatively, the reflection portion 38*a*, 38*b* of the reflector 26*d* may be rectangular or substantially rectangular. In the fifth embodiment illustrated in FIG. 5(E), the reflection portion 38*a*, 38*b* of the reflector 26*e* may have a horseshoe shape. Although specific shapes have been described, it appreciated the reflection portions 38*a*, 38*b* may be of any appropriate shape, that allows for the reflection of light from an associated light source 24 and the creation of a pseudo-flame shape.

Figures 6A, 6B, 6C:
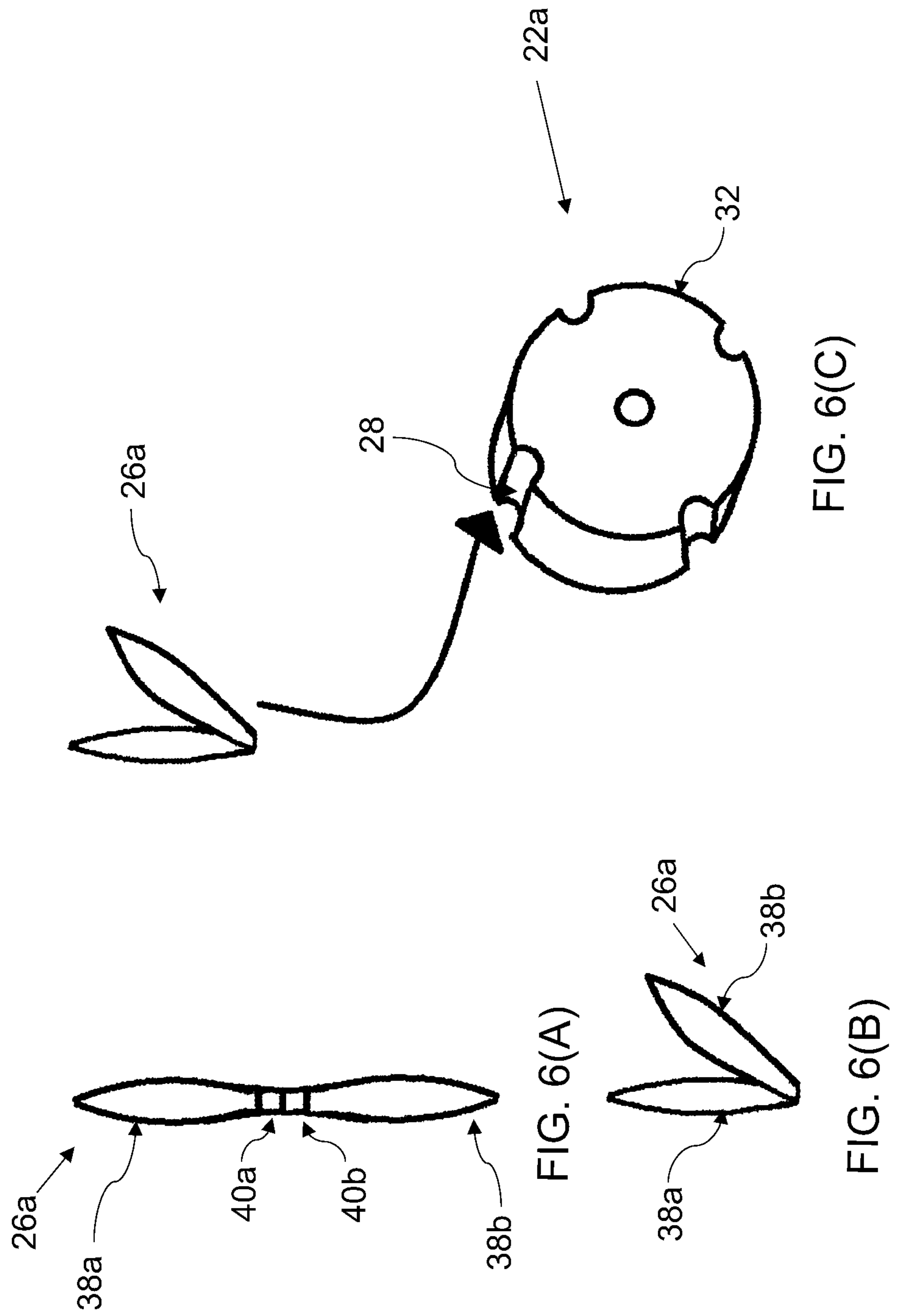
FIGS. 6(A)-6(C) show, in FIG. 6(A), the reflector of FIG. 5(A) in an open state, in FIG. 6(B), the reflector of FIG. 6(A) in a bent state, and in FIG. 6(C), the said reflector being inserted into a reflector support.

FIGS. 6(A)-6(C) illustrate the process to attach a reflector to a reflector support 22*a*.

In the illustrated embodiment, to attach the reflector 26*a*, shown in FIG. 6(A) to the reflector support 22*a*, the user folds the reflector at the engagement portion 40*a*, 40*b*, as shown in FIG. 6(B) which may be defined by a perforated edge, such that both reflection portions 38*a*, 38*b* extend in the same axial direction. The engagement portion 40*a*, 40*b* of the reflector 26*a* is then exposed as the reflection portions 38*a*, 38*b* extend away from the engagement portion 40*a*, 40*b*. The user than places the engagement portion 40*a*, 40*b* into a reflector mounting portion 28, as shown in FIG. 6(C). As the engagement portion 40*a*. 40*b* is complementarily shaped to the reflector mounting portions 28, the engagement portion 40*a*, 40*b* mounts to the reflector mounting portion 28 with ease.

It will be apparent to the skilled person that whilst formation of the reflector 26*a* by being in half creates a suitable multi-component reflection, it will be possible to merely install multiple discrete reflectors into a corresponding reflector mounting portion 28.

Figure 7:
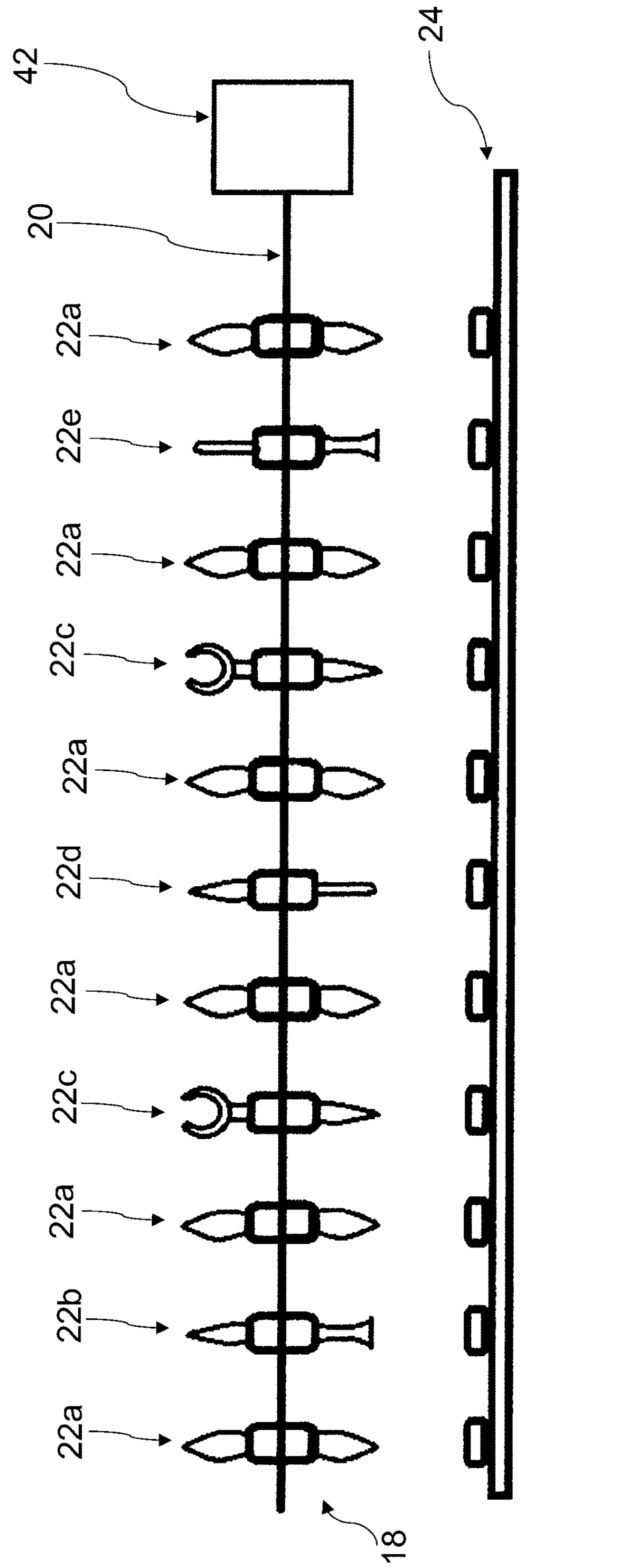
FIG. 7 shows a front view of the first embodiment of the flame effect device of FIG. 2, with each reflector support aligned above an associated light source, the spindle being connected to a motor for rotation.

FIG. 7 shows the flame effect device 18 in use, attached to an associated motor 42 to rotate the spindle 20, and positioned above associated light sources 24.

As previously mentioned, the light sources 24 may be LED lights spotlights or other non-LED light sources such as incandescent, halogen or fluorescent bulbs. The user may arrange the light sources 24 on a strip. Light sources 24 of differing colours may be used. For example, there may be a majority of yellow lights, with a couple of blue or red lights. The colours of the light sources 24 will be chosen by the user. The colour combinations chosen by the user are determined by the desired flame effect. The light sources 24 may be positioned at even increments away from one another, alternatively the light sources 24 may be positioned at random increments along the strip. Although a strip of light sources 24 has been described, the light sources 24 may be individually placed in desired positions.

Once a user has determined the flame effect and thus the colour of the light sources 24 they desire, and they have determined the position of the light sources 24 along the strip, the user assembles the flame effect device 18. Alternatively, the user may assemble the flame effect device 18 before selecting, or arranging the light sources 24.

The user selects a reflector 26*a*, 26*b*, 26*c*, 26*d*, 26*e* shape and size of interest. This selection may be driven by the desired flame shape, duration, flame height and intensity. This in turn may be dictated by which coloured light source 24 the reflector 26*a*, 26*b*, 26*c*, 26*d*, 26*e* may be positioned over, and the desired flame shape, duration, flame height and intensity of said colour. Larger reflectors 26*a*, 26*b*, 26*c*, 26*d*, 26*e* may provide an imitation flame with a larger height, that provides a longer 'flicker'. Therefore, the user may choose to place the larger reflector 26*a*, 26*b*, 26*c*, 26*d*, 26*e* shapes on reflector supports 22*a*, 22*b*, 22*c*, 22*d*, 22*e* that will be arranged over the desired dominant fire colour, and smaller reflector 26*a*, 26*b*, 26*c*, 26*d*, 26*e* shapes on reflector supports 22*a*, 22*b*, 22*c*, 22*d*, 22*e* that will be arranged over the desired subservient fire colour.

The number of points provided on the reflector 26*a*, 26*b*, 26*c*, 26*d*, 26*e* may also affect the shape of the flame produced. For example, one imitation flame will be produced from reflectors having one point, whereas the use of a reflector 26*a*, 26*b*, 26*c*, 26*d*, 26*e* having two points, such as the horseshoe shape, will produce two imitation flames.

The user also selects a reflector support 22*a*, 22*b*, 22*c*, 22*d*, 22*e*. The selection may be made either prior to the selection of the reflector 26*a*, 26*b*, 26*c*, 26*d*, 26*e*, or after the selection of the reflector 26*a*, 26*b*, 26*c*, 26*d*, 26*e*. As the reflector mounting portions 28 and engagement portions 40*a*, 40*b* of the reflector supports 22*a*, 22*b*, 22*c*, 22*d*, 22*e* and reflectors 26*a*, 26*b*, 26*c*, 26*d*, 26*e* respectively are preferably universally and complementary dimensioned, the reflector supports 22*a*, 22*b*, 22*c*, 22*d*, 22*e* can engage with any selected reflector 26*a*, 26*b*, 26*c*, 26*d*, 26*e*. The selection of the reflector support may be driven by the desired speed of the 'flame flicker'. A reflector support with an increased number mounting portions can mount an increased number of reflectors. The higher the number of reflectors mounted to each reflector support, the faster the speed of the 'flame flicker'. Accordingly, the converse applies, the lower the number of reflectors mounted to each reflector support, the slower the speed of the 'flame flicker'. Therefore, the user may choose to place reflector supports, with a higher number of mounting portions above lights sources they wish to have an increased 'flicker' in the flame effect, such as blue and/or yellow lights.

The user then engages the reflector 26*a*, 26*b*, 26*c*, 26*d*, 26*e* with the reflector support 22*a*, 22*b*, 22*c*, 22*d*, 22*e*. Engagement may be achieved through an interference fit, press-fit, shape-mating engagement or the like. The engagement portion 40*a*, 40*b* may be secured to the reflector mounting portion 28 by an engagement aid, such as a chemical glue. Alternative engagement aids can be envisaged, such as grub screws, Velcro or magnets. Alternatively, the complementary shapes of the engagement portion 40*a*, 40*b* and reflector mounting portion 28 may allow for shape-mating engagement that does not require additional aid. The user can place any reflector 26*a*, 26*b*, 26*c*, 26*d*, 26*e* of their choice in the reflector mounting portion 28, as the reflector mounting portion 28 and engagement portions 40*a*, 40*b* of the reflectors are preferably of universal dimensions to allow interchangeability, so the user can create a bespoke reflector support 22*a*, 22*b*, 22*c*, 22*d*, 22*e*. The engagement step is repeated by the users for the desired number of reflectors 26*a*, 26*b*, 26*c*, 26*d*, 26*e*. Therefore, the user can create a bespoke flame effect device that is comprised of reflector supports with differing numbers of reflector mounting portions, and/or differing numbers of reflectors and/or reflectors of differing shapes and sizes, to allow the user's desired flame effect to be achieved.

Once the user has placed the desired reflectors 26*a*, 26*b*, 26*c*, 26*d*, 26*e* and number of reflectors 26*a*, 26*b*, 26*c*, 26*d*, 26*e* on the reflector support 22*a*, 22*b*, 22*c*, 22*d*, 22*e*, the user affixes the reflector supports 22*a*, 22*b*, 22*c*, 22*d*, 22*e* to the spindle 20.

To mount the reflector supports 22*a*, 22*b*, 22*c*, 22*d*, 22*e* to the spindle 20, the user slides the reflector supports 22*a*, 22*b*, 22*c*, 22*d*, 22*e* onto the longitudinal axis of the spindle 20. The dimension of the mounting aperture 34 allows for the reflector supports 22*a*, 22*b*, 22*c*, 22*d*, 22*e* to be slid with resistance along the spindle 20. This is advantageous as the movement of the reflector supports 22*a*, 22*b*, 22*c*, 22*d*, 22*e* allows them to be aligned with the desired light source 24.

The diameter of the mounting aperture 34 is beneficially the same or substantially the same as the diameter of the spindle 20 to ensure that although the reflector supports 22*a*, 22*b*, 22*c*, 22*d*, 22*e* can be moved along the longitudinal axis of the spindle 20 whilst under force from a user, they do not move along the longitudinal axis of the spindle 20 unaided, or whilst rotating with the spindle 20. If the diameter of the mounting aperture was substantially larger than the diameter of the spindle 20, there would be a risk of the reflector supports 22*a*, 22*b*, 22*c*, 22*d*, 22*e* moving in an undesired manner. For example, the reflector support 22*a*, 22*b*, 22*c*, 22*d*, 22*e* could move along the longitudinal axis of the spindle 20 and therefore out of alignment with its respective light source 24, or the reflector support 22*a*, 22*b*, 22*c*, 22*d*, 22*e* may not rotate at the same time as the spindle 20 due to a lack of engagement.

Once the reflector supports 22*a*, 22*b*, 22*c*, 22*d*, 22*e* have been slid onto the spindle 20. The user moves the reflector supports 22*a*, 22*b*, 22*c*, 22*d*, 22*e* to the desired position on the spindle 20, this position is likely to be aligned with an associated light source 24. This is beneficial as it allows for different arrangements of light sources 24 to be accommodated.

Due to the reflector mounting portions 28 being parallel or substantially parallel to the longitudinal axis of the spindle 20, the major faces of the reflectors 26*a*, 26*b*, 26*c*, 26*d*, 26*e* are aligned with the light beams of the light sources 24 to maximise the reflection and create the desired shape as dictated by the reflector shape.

As the reflectors 26*a*, 26*b*, 26*c*, 26*d*, 26*e* can be of numerous shapes and dimensions, the user can create a bespoke reflector supports 22*a*, 22*b*, 22*c*, 22*d*, 22*e* that align with their wanted flame effect. The user may choose reflectors 26*a*, 26*b*, 26*c*, 26*d*, 26*e* that are all the same, some reflectors 26*a*, 26*b*, 26*c*, 26*d*, 26*e* the same and some different reflectors 26*a*, 26*b*, 26*c*, 26*d*, 26*e*, or the user may choose to use all different reflectors 26*a*, 26*b*, 26*c*, 26*d*, 26*e*. This tailoring of the reflector support 22*a*, 22*b*, 22*c*, 22*d*, 22*e* can be performed for each individual reflector support 22*a*, 22*b*, 22*c*, 22*d*, 22*e* such that when they are placed together to form the flame effect device 18, each reflector 26*a*, 26*b*, 26*c*, 26*d*, 26*e* has been individually selected and arranged to create an individual and bespoke flame effect.

Additionally, although multiple reflector mounting portions 28 may be provided on the reflector supports 22*a*, 22*b*, 22*c*, 22*d*, 22*e*, the user may select to only use one or some of the available reflector mounting portions 28. The predetermined positions of the reflector mounting portion 28 varying depending on how many reflector mounting portions 28 are provided. Therefore, the user may prefer the spacing provided between reflector mounting portions 28 on a reflector support 22*a*, 22*b*, 22*c*, 22*d*, 22*e* with more than one reflector mounting portion 28, even if they do not want to utilise all of the reflector mounting portions 28. Alternatively, the user may select to only use one of the available reflector mounting portions 28. The user therefore has complete control over the flame effect provided.

Once the user has placed all the desired reflector supports 22*a*, 22*b*, 22*c*, 22*d*, 22*e* onto the spindle 20, the spindle 20 may be placed in the electric fire 10 assembly, if it was removed for mounting of the reflector supports 22*a*, 22*b*, 22*c*, 22*d*, 22*e*. The spindle 20 may be engaged with an associated motor to rotate the spindle 20.

Figure 8:
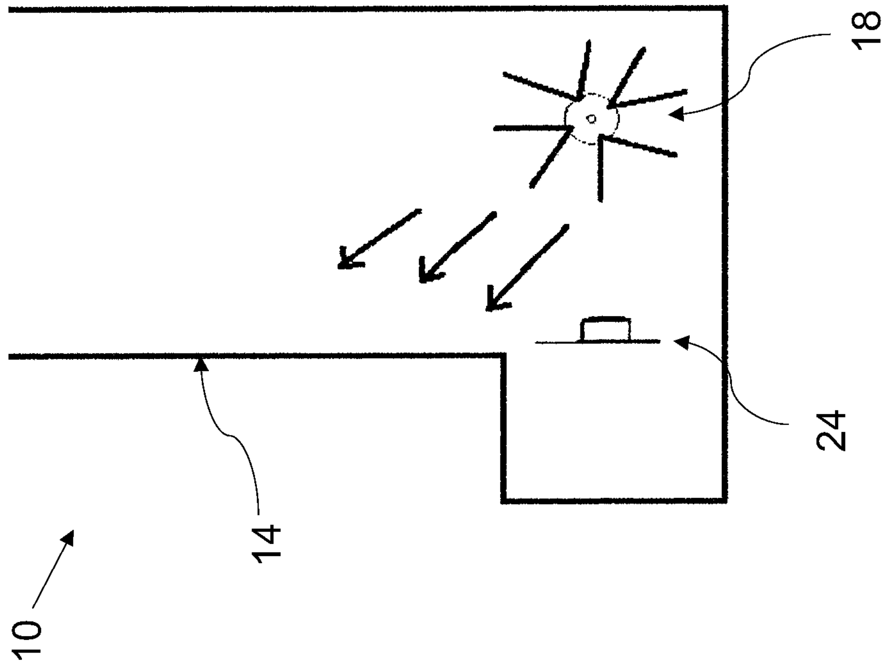
FIG. 8 shows a vertical cross-section from the side of the flame simulator apparatus of FIG. 1.

As depicted in FIG. 8, the spindle 20 is placed near the bottom of the electric fire 10. The flame effect device 18 is placed such that the light from the light source 24 is perpendicular to the longitudinal axis of the spindle 20. As shown in FIG. 8*a*, the flame effect device 18 may reflect the light from the light source 24 directly onto a projection screen 14 of an electric fire 10.

Figure 9:
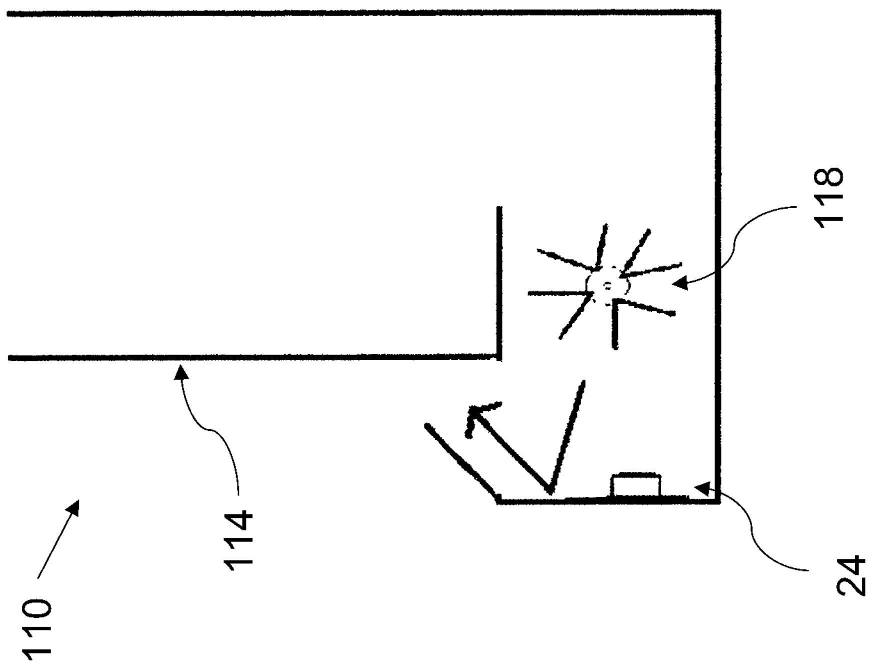
FIG. 9 shows a vertical cross-section from the side of a second embodiment of a flame simulator apparatus in accordance with the fourth aspect of the invention.

An alternative embodiment of electric fire 110 is depicted in FIG. 9, the flame effect device 118 may reflect the light from the light source 124 indirectly onto a projection screen 114 of an electric fire 110 via a mirror. The flame effect device 118 being able to be positioned such that it directly or indirectly reflects onto the projection screen 114 increases the versatility of the flame effect device 118, as it may be retrofitted with ease into different electric fires. The electric fire may have a front channel through which the light reflects onto the projection screen 114.

Although one spindle has been described, it is imagined the flame effect device could include multiple spindles to increase the dimensionality of the flame effect created.

Although the perimeter of the mounting aperture has been described as preferably bound by the first and second major opposed surfaces, it is foreseeable that the reflector support body may also have an attachment aperture. The attachment aperture may extend radially from the mounting aperture to the perimeter of the reflector support body. The provision of an attachment aperture may allow for a user to slot the reflector supports onto the spindle with ease, and without dismantling the spindle. It may also allow for the flame effect device to be customised more easily, as a reflector body may be added halfway along the spindle without the preceding reflector supports needing to be removed. However, having an attachment aperture may weaken the structural integrity of the reflector supports, and may affect the rotation of the reflector supports.

Although the reflector supports have been described as being slidably mounted onto the spindle. If the reflector supports have an attachment aperture, the reflector supports may be directly clipped onto the spindle, in the direct position that is desired. This removes the need to slide the reflector supports on in the correct order. The body of the reflector supports being made from an at least in part resilient material allows the expansion of the attachment aperture when under force being placed onto the spindle, placing the attachment aperture in an open condition. Whereas, once the reflector support is on the spindle, the nature of the at least in part resilient material allows the attachment aperture to revert back to a sealed closed condition so that the reflector support cannot be removed from the spindle without force. Beneficially, the spindle may therefore already be attached to the electric fire apparatus when the reflector supports are mounted to it.

Although the reflector supports have been described as identical in dimension in shape, and this arrangement is beneficial, it is foreseen the reflector supports may not be of identical dimension and shape, and the flame effect device would be functional.

Although the reflector mounting portion has been described as a recessed slot, it is foreseen that the reflector mounting portion may be formed as a protruding aperture, a recessed aperture, or that no reflector mounting portion may be provided. Having no defined reflector mounting portion would be disadvantageous to the alignment of the reflectors and for manufacture, however the flame effect device would be functional.

Whilst four recessed slots have been depicted and described, it is appreciated that any number of recessed slots, or reflector mounting portions, may be provided upon each reflector support.

Although the engagement portions of the reflectors are described as being of the same or similar dimensions and shapes to one another, it is foreseen that the engagement portions of the reflectors may be of different dimensions and shapes to one another. However, this is envisaged to be disadvantageous as the reflector may not engage with the reflector mounting portions as well. Being of different dimensions and shapes may also reduce the universal and interchangeable nature of the reflectors and reflector supports.

Although the major faces of the reflection portion are described as preferably flat and smooth to encourage reflection, they may be non-smooth, such as dimpled, ridged chequered and the like. However, this is envisaged as being less preferable, as unwanted reflection of light from the light source may occur.

Although the spindle has been described to be of uniform thickness, it is foreseeable that a spindle without uniform thickness could be utilised.

Although the projection screen in the electric fire has been described and depicted as being parallel to the outer casing of the electric fire, the projection screen may be angled or tilted relative to the out casting of the electric fire. Providing the projection screen at an angle may change the flame effect achieved by use of the flame effect device.

It is foreseen, that additional stationary reflection elements may be utilised within the electric fire alongside the flame effect device. The addition of stationary reflection elements may provide differing flame effects.

It is therefore possible to provide a flame effect device which is customisable to create an improved flame effect for an electric fire. This is achieved by the provision of modules, in the form of individual reflector supports, to which reflectors are added. The modules can be added to the spindle in any orientation, whilst being aligned to the illuminators of the electric fire, to create a desirable flame effect.

The words 'comprises/comprising' and the words 'having/including' when used herein with reference to the present invention are used to specify the presence of stated features, integers, steps or components, but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of examples only, and various other modifications will be apparent to persons skilled in the field without departing from the scope of the invention as defined herein.

What is claimed is:

1. A flame effect device for a flame simulator apparatus of an electric fire, the flame effect device comprising:
- a spindle having a longitudinal axis which in-use rotates in a flame simulator apparatus; and
- a plurality of reflector supports each reflector support comprising:
  - a reflector support body having at least one reflector mounting portion thereon and a mounting aperture to engage the reflector support with the spindle; and
  - at least one reflector to reflect light from an associated light source,
  - wherein the at least one reflector is mounted to the at least one reflector mounting portion,
- the plurality of reflector supports adapted to engage with the spindle, each reflector support of the plurality of reflector supports adapted to be selectably positioned and spaced along the longitudinal axis of the spindle.

2. The flame effect device of claim 1, further comprising at least one of the following:
- wherein each reflector support body of the plurality of reflector supports is at least in part rigid or resilient; and
- wherein each reflector support of the plurality of reflector supports is adapted to slidably move along the longitudinal axis of the spindle.

3. The flame effect device of claim 1, wherein the spindle has a uniform thickness along the longitudinal axis.

4. The flame effect device of claim 1, wherein the reflector support body directly contacts the spindle around an entire perimeter of the mounting aperture.

5. The flame effect device of claim 1, further comprising at least one of the following:
- wherein the at least one reflector mounting portion is in a pre-determined position on the outer surface of each reflector support;
- wherein the at least one reflector mounting portion has a major axis parallel or substantially parallel to the longitudinal axis of the spindle;
- wherein a plurality of said reflector mounting portions is provided, with each reflector mounting portion having the same dimensions as each other; and
- wherein the at least one reflector mounting portions is formed as a recess on the outer surface of each reflector support of the plurality of reflector supports.

6. The flame effect device of claim 1, wherein at least one of said plurality of reflector supports has a plurality of reflectors, and the plurality of reflectors of the at least one said plurality of reflector supports is different in number to the at least one reflector of at least one other said plurality of reflector supports.

7. The flame effect device of claim 1, wherein the at least one reflector has an engagement portion which receivably engages with the at least one reflector mounting portion.

8. The flame effect device of claim 7, wherein the engagement portion of each reflector of the plurality of reflectors are identical.

9. The flame effect device of claim 7, wherein each reflector of the plurality of reflectors has at least one reflection portion to reflect light from an associated light source.

10. The flame effect device of claim 9, wherein at least one reflector of the plurality of reflectors has a said reflection portion of a different shape to a reflection portion of at least one other reflector of the plurality of reflectors.

11. The flame effect device of claim 9, wherein at least one reflector of the plurality of reflectors has a said reflection portion of a different shape to at least one other reflection portion of said at least one reflector of the plurality of reflectors or of a same shape as at least one other reflection portion of said at least one reflector of the plurality of reflectors.

12. The flame effect device of claim 1, wherein each reflector support has a plurality of reflector mounting portions having the same dimensions as one another.

13. The flame effect device of claim 1, wherein the reflector support body has a friction coefficient substantial enough to hold on to the spindle without a fixing element.

14. The flame effect device of claim 1, wherein each reflector support further comprises a fastening element to engage with the spindle.

15. The flame effect device of claim 14, the fastening element comprises a washer and/or an O-ring and/or glue and/or a screw.

16. The flame effect device of claim 1, wherein the diameter of the mounting aperture is of a similar or substantially similar dimension to the diameter of the spindle.

17. A method of assembling a flame effect device, the method comprising the steps of:

a. providing a spindle suitable to be used in an electric fire;

b. providing a plurality of reflector supports to engage with said spindle;

c. selectably engaging at least one reflector with each reflector support of the plurality of reflector supports;

d. selectably engaging and positioning each reflector support of the plurality of the reflector supports with a longitudinal axis of the spindle in a specific spaced configuration to get a desired flame effect; and e. placing the spindle within the electric fire.

18. A flame simulator apparatus comprising:

a flame simulator housing;

the flame effect device according to claim 1 which is positioned in the flame simulator housing; and a light source positioned in the flame simulator housing and which is arranged to direct light towards the flame effect device to create a flame effect displayed from the flame simulator apparatus.

* * * * *